Nov. 19, 1963    R. C. BAENZIGER    3,111,287
FISHING REEL
Filed April 4, 1960    3 Sheets-Sheet 1
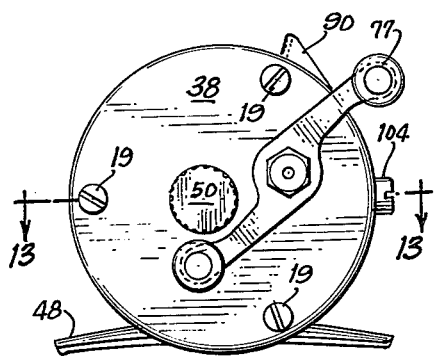
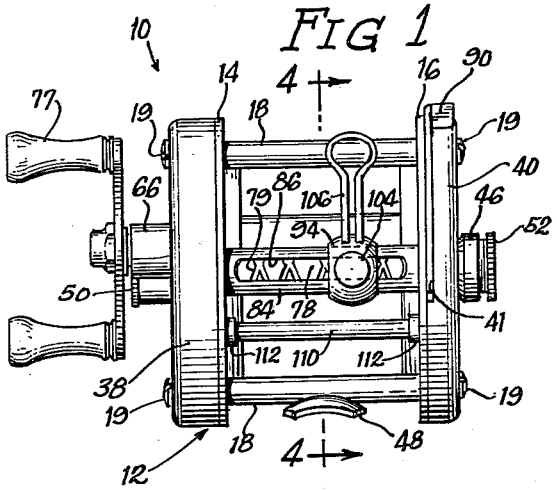
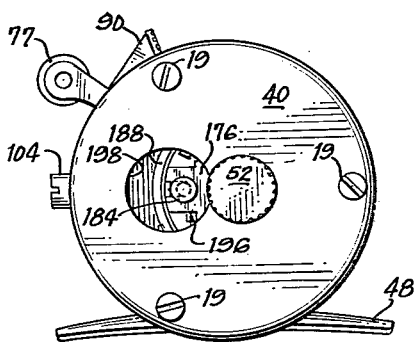
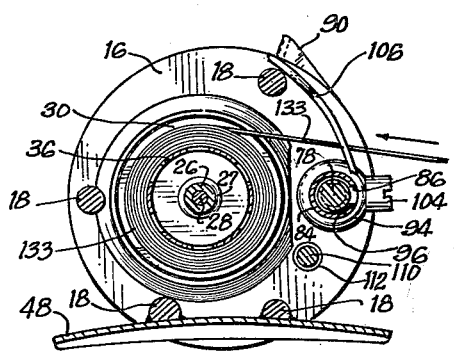
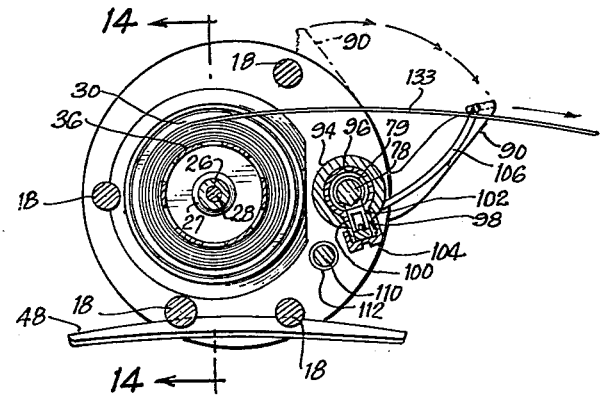
INVENTOR.
Robert C. Baenziger
BY Julius L. Rubinstein
Attorney Nov. 19, 1963 R. C. BAENZIGER 3,111,287
FISHING REEL
Filed April 4, 1960 3 Sheets-Sheet 2

INVENTOR.
Robert C. Baenziger
BY Julius L. Rubinstein
Attorney

Nov. 19, 1963   R. C. BAENZIGER   3,111,287
FISHING REEL
Filed April 4, 1960   3 Sheets-Sheet 3
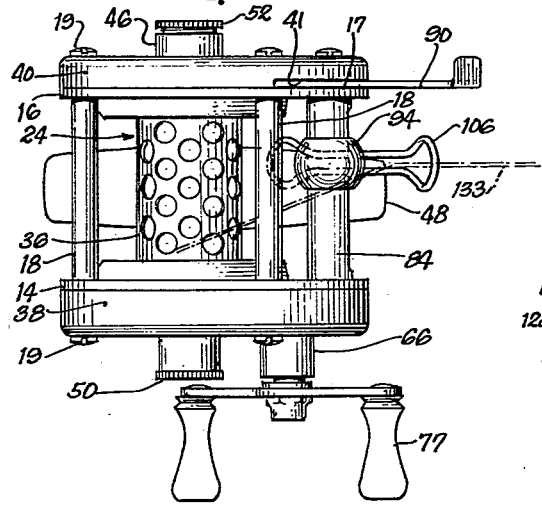
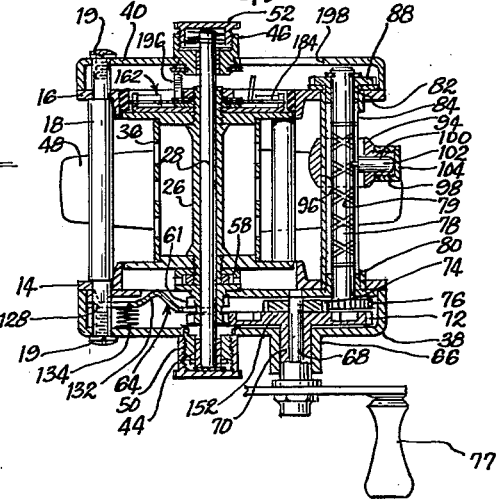
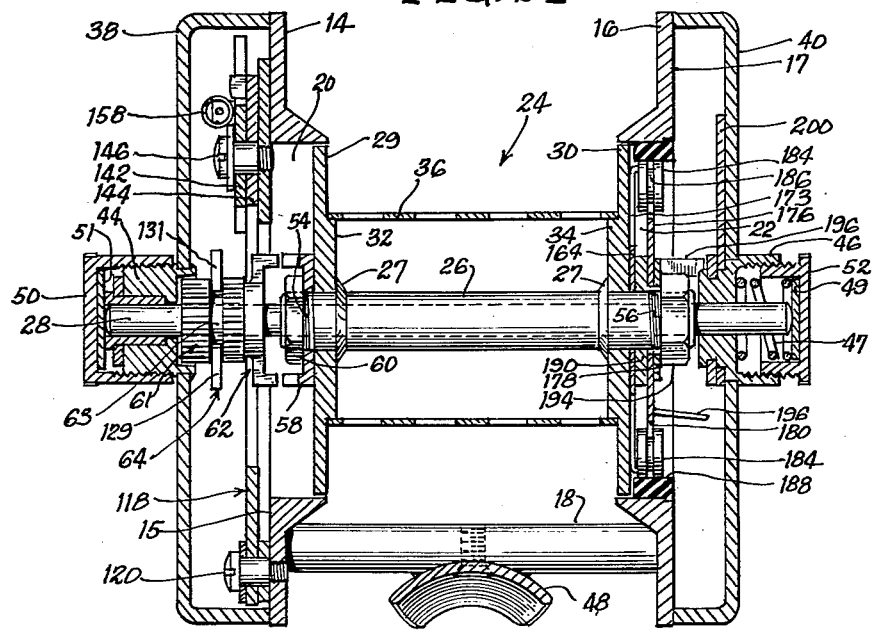
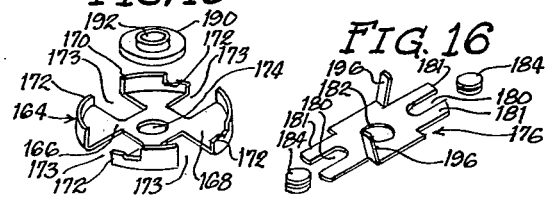
INVENTOR.
Robert C. Baenziger
BY Julius L. Rubinstein
Attorney United States Patent Office 3,111,287
Patented Nov. 19, 1963

3,111,287
FISHING REEL
Robert C. Baenziger, 2128 W. Leland, Chicago, Ill.
Filed Apr. 4, 1960, Ser. No. 19,803
9 Claims. (Cl. 242—84.44)

This invention relates to a fishing reel and more particularly to a free spool fishing reel with a non-interfering level wind and an internally adjustable centrifugal drag.

It is desirable for a fishing reel to be designed for free spool movement during casting because in that condition only the hub of the reel rotates and all other gears and parts remain stationary. The advantage of this arrangement is that distance, accuracy, and control of the cast is increased because dirt, wear, or corrosion in the other movable parts of the fishing reel which would otherwise introduce variations in the drag, has no effect during casting.

In the past, efforts have been made to design fishing reels with free spool movement having means for disconnecting the level wind from the rotating hub of the reel so that the level wind remains stationary during the cast. These prior efforts were not very successful because during a cast the oscillatory movement of the line between the sides of the hub, due to the way the line is wound thereon by the level wind, caused the fishing line to periodically engage the sides of the level wind at a rather sharp angle. This introduced unpredictable variations in the drag. When the weight on the line is very light these variations in drag had a marked effect on accuracy of cast.

Heretofore, efforts have been made to eliminate this problem by completely disconnecting the fishing line from the level wind during the cast. This, however, created other difficulties, because in order to reel in the fishing line, the line first had to be manually reinserted in the level wind. This was objectionable and often inconvenient, particularly when a fish would strike at the bait as soon as it hit the water. In such a situation it is sometimes immediately necessary to begin reeling in the line to prevent the fish from escaping.

Some other fishing reels have been designed so that when the fishing reel is adjusted for free spool action, the sides of the level wind became free to move laterally. Theoretically with this arrangement the line will not engage the sides of the level wind with enough force to introduce appreciable drag. In practice, however, during the cast the axis of the hub instead of being horizontal is more nearly vertical so that the movable sides of the level wind would gravitate close together. This completely nullified the purpose for which the movable sides were designed because the gravitational effect on the sides of the level wind caused the fishing line to engage these sides with enough force to introduce unpredictable and disturbing variations in drag during a cast.

Besides this, in prior reels the reel handle, during rewind, had to be turned a number of times before the level wind again became operative. During this time the fishing line was not wound evenly and when thick fishing line was used the uneven lumps caused by the inactivity of the level wind was very pronounced. This adversely affected the operation of the fishing reel during casting.

It is apparent that it would be desirable to provide a fishing reel with free spool action and an adjustably mounted level wind which is moved to a cast position where it does not appreciably interfere with the fishing line during a cast, but retains the line so that during rewind, the fishing line does not have to be manually reinserted therein. It is further apparent that it would be desirable for such a fishing reel to be designed so that turning the handle during rewind after a cast automatically and promptly reconnects the hub of the spool to the gear mechanism so it no longer has a free spool action and causes the level wind to quickly resume its operational reel-in position.

What is needed therefore and comprises an important object of this invention is a fishing reel having all the above described advantageous and desirable features.

This and other objects of this invention will become more apparent when read in the light of the accompanying specification and drawings wherein:

FIG. 1 is a front elevational view of the improved fishing reel in a reel-in position;

FIG. 2 is a side elevational view of the improved fishing reel in a reel-in position;

FIG. 3 is an elevational view of the improved fishing reel showing the side opposite to that shown in FIG. 2;

FIG. 4 is a sectional view taken on the line 4—4 of FIG. 1;

FIG. 5 is a view similar to that of FIG. 4 but with the fishing reel in a free spool casting position;

FIG. 12 is a top view of the fishing reel in a casting position;

FIG. 13 is a sectional view taken on the line 13—13 of FIG. 2;

FIG. 14 is a sectional view taken on the line 14—14 of FIG. 5 but with the fishing line removed;

FIG. 15 is a perspective view of the abutment plate and spacer in the centrifugal governor;

FIG. 16 is a perspective view of a support plate and rollers adapted to be mounted thereon;

FIG. 17 is the end view of the hub of the fishing reel showing a modification of the centrifugal drag.

Figure 6:
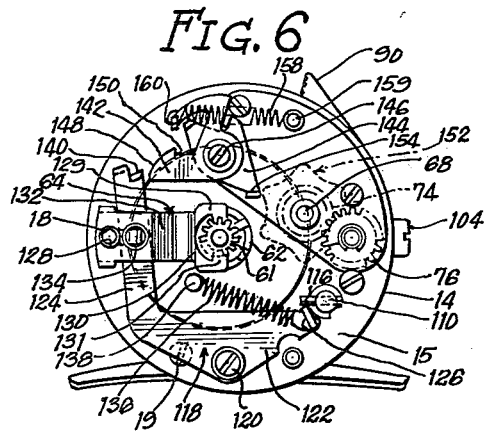
FIG. 6 is a view like that of FIG. 2 but with the cover removed to show the mechanism therein.

Referring now to FIG. 1 of the drawing, a fiishing reel indicated generally by the reference numeral 10 includes a reel frame 12. The reel frame is composed of side plates 14 and 16 which are secured together in spaced parallel relationship by connecting bars 18. The ends of these bars are reduced and provided with threaded openings adapted to receive retaining screws 19 (see FIG. 13).

The side plates 14 and 16 are provided with circular openings 20 and 22 extending therethrough for receiving the spool assembly or hub 24 of the reel 10 (FIG. 14). The spool assembly or hub in this particular embodiment comprises a tubular support shaft 26 which is coaxial with and rigidly secured to an internal bearing shaft 28. Collars 27 are integrally formed near the ends of the support shaft 26. Circular side members 29 and 30, coaxially mounted on the shaft 26 bear against collars 27. The side members 29 and 30 are provided with integrally formed bosses 32 and 34. These bosses position and hold a cylindrical perforate tubular fishing line support 36 on which the fishing line is wound. It is noted, however, that the particular form or arrangement of parts in the spool assembly or hub is not critical.

As best seen in FIGS. 1, 2 and 3, cover members 38 and 40 are secured to end plates 14 and 16 by means of the retaining screws 19 which extend through end plates 14 and 16 into threaded engagement with the threaded openings in the ends of connecting bars 18 (see FIG. 13). The cover members are provided with lineally spaced bearing assemblies 44 and 46 in which the ends of shaft 28 are rotatably mounted whereby the hub is free to rotate in the reel frame. One of the connecting bars 18 is secured to a base member 48 whereby the fishing reel may be attached to a fishing rod.

As best seen in FIG. 14, the bearing assemblies 44 and 46 are protected by threaded caps 50 and 52. In particular bearing 46 is provided with an internally threaded recess. A coil spring 47 is positioned in this recess coaxial with the end of shaft 28. One end of coil spring 47 bears against the end wall of bearing 46 and the other end bears against the inner surface of washer 49 mounted in cap 52. When cap 52 is screwed into the recess in bearing 46, the spring 47 is compressed, while the ends of shaft 28 are squeezed between washers 49 and 51. With this arrangement, the frictional drag of the hub 24 may be adjusted by screwing cap 52 into or out of bearing 46. Consequently, the caps 50 and 52 both regulate the frictional drag on the hub and keep the bearing assembly clean.

As further seen in FIG. 14, end portions 54 and 56 of tubular support shaft 26 are threaded. A clutch member 58 is inserted on the end of shaft 26 against side member 29. A nut 60 is in threaded engagement with the end 54 of shaft 26. This nut is screwed tightly on the shaft and serves to force the clutch member 58 against the side member 29. This in turn forces side member 29 against collar 27. With this arrangement the clutch member 58 and the side member 29 are rigidly secured to shaft 26.

A clutch member 62 integrally combined with a pinion 61 is slidably mounted on shaft 28. This clutch member is movable into clutching engagement with clutch member 58 so that when the hub 24 rotates the clutch member 62 and pinion 61 also rotate. As will be explained below, when the clutch member 62 is out of clutching engagement with clutch member 58 the clutch member 62 and pinion 61 do not rotate with the hub.

The pinion 61 is formed in two parts which are separated by a reduced central portion 63. This reduced central portion is engaged by a cam bar 64 (see FIGS. 6, 10 and 14) for purposes to be described below.

As seen in FIGS. 1, 12 and 13, cover member 38 is provided with a tubular bearing boss 66. A bearing shaft 68 secured at one end to side plate 14 extends perpendicularly therefrom and on through bearing boss 66. A drive shaft 70 is rotatably mounted on bearing shaft 68 and slides against the inner surface of bearing boss 66. A drive gear 72 is integrally formed with the drive shaft 70 and is concentric therewith. This drive gear is in meshing engagement with pinion 61. A second gear 74 also integrally formed with the drive shaft 70 is in meshing engagement with a pinion or gear 76 for reasons to be described below. A handle 77 is rigidly secured to drive shaft 70. With this arrangement, rotation of handle 77 causes shaft 70 and gears 72 and 74 to rotate. These in turn cause pinion 61 and gear 76 to rotate.

As seen in FIG. 13, gear 76 is rigidly secured to a shaft 78 rotatably mounted on side plates 14 and 16 by any conventional means so that rotation of gear 76 causes shaft 78 to rotate. Shaft 78 is provided with reverse running threads 79 and is part of the level wind mechanism to be described below.

Figure 8:
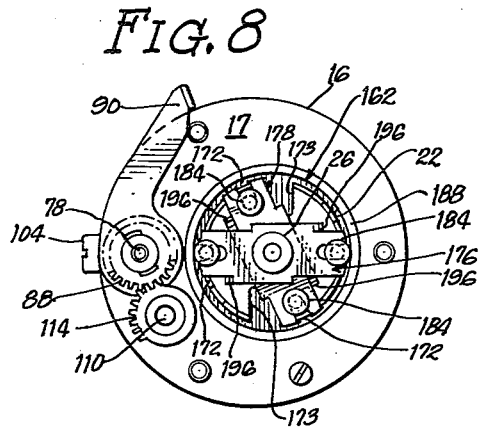
FIG. 8 is a view like that of FIG. 3 but with the cover removed to show the centrifugal governor and the mechanism therein.

A sleeve bearing 80 is rigidly secured to side plate 14. This sleeve bearing is in axial alignment with an opening 82 formed in side plate 16. A sleeve shaft 84 concentric with shaft 78 is rotatably mounted on the sleeve bearing 80 and in the opening 82. Sleeve shaft 84 is provided with an elongated slot 86 (see FIG. 1). In addition, as best seen in FIG. 8, a coaxial gear 88 and lever arm 90 are rigidly secured to the end of sleeve shaft 84 on the outer surface 17 of end plate 16. As best seen in FIG. 12, the edge of cover member 40 is recessed to define a slot 41 into which the lever arm 90 can be moved. With this arrangement rotation of lever arm 90 causes sleeve shaft 84 and gear 88 to rotate.

A carriage member 94 is provided with a cylindrical sleeve shaft receiving opening 96 through which the sleeve shaft 84 slidably extends (see FIG. 13). The carriage member is also provided with an externally threaded tubular boss 98 whose opening 100 communicates with opening 96. A thread engaging pin 102 is mounted in opening 100 in contact with the reverse threads 79 on shaft 78. A cap 104 is secured to the threaded boss 98 to retain pin 102 in opening 100. In addition, as seen in FIGS. 1 and 12, the ends of an elongated wire member arcuate in longitudinal cross section are secured to carriage member 94 to form a line guide or closed loop 106. It is noted that with pin 102 engaging the reverse threads 79, rotation of sleeve shaft 84 causes carriage member 94 and closed loop 106 to rotate therewith. In addition, rotation of shaft 78 causes carriage member 94 and closed loop 106 to slide on the outer surface of sleeve shaft 84 and reciprocate or oscillate back and forth thereon in a manner characteristic of level winds for fishing reels.

To this point, it is clear that rotation of handle 77 causes drive shaft 70 and gears 72 and 74 to rotate. Then if the clutch member 62 is in engagement with clutch member 58, the hub 24 of the fishing reel rotates and the carriage 94 and closed loop 106 reciprocate on a straight path on the surface of sleeve shaft 84.

As best seen in FIG. 1, a link shaft 110 in spaced parallel relationship to shafts 78 and 84 is rotatably mounted in bearings 112 which are secured to end plates 14 and 16. A gear segment 114 (see FIG. 8) is rigidly secured to one end of shaft 110 over surface 17 of end plate 16, while a push arm 116 is rigidly secured to the opposite end of shaft 110 over surface 15 of end plate 14 (see FIG. 6). The gear segment 114 is in mesh with gear 88 so that when arm 90 is pivoted causing sleeve shaft 84 to rotate, link shaft 110 also rotates.

Figure 10:
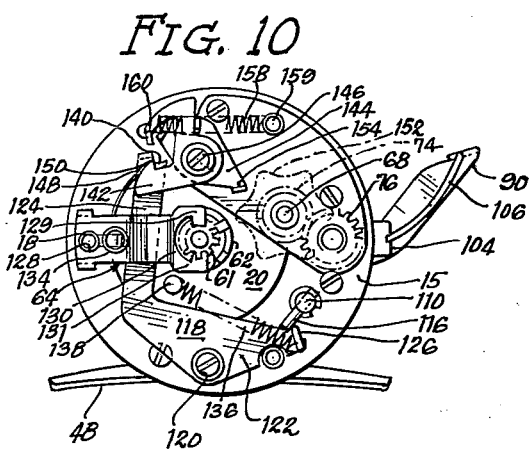
FIG. 10 is a view like that of FIG. 6 showing the arrangement of the internal parts of the fishing reel when it is in casting position.

An actuating lever 118 is pivotally mounted on pivot screw 120 on end plate 14 (see FIGS. 6 and 10). Lever 118 includes arms 122 and 124. Arm 122 is provided with an ear member 126 at one end which engages push arm 116. With this arrangement, operation of lever 90 causes push arm 116 to move against ear member 126. This engagement pivots the actuating lever 118 from the position shown in FIG. 6 to the position shown in FIG. 10.

As best seen in FIGS. 10 and 13, cam bar 64 is provided with an opening 128 at one end through which a reduced end portion of a connecting bar 18 extends. The opposite end 130 of cam bar 64 is forked, as shown in FIGS. 6 and 10, and its converging tines 129 and 131 embrace the reduced central portion 63 of pinion 61 (see FIG. 14). The intermediate part of cam bar 64 is bent to provide a cam surface 132 (see FIG. 13).

When actuating lever 118 is pivoted from the position shown in FIG. 6 to the position shown in FIG. 10, arm 124 moves into engagement with cam surface 132. This engagement moves the tines 129 and 131 in such a way that they separate clutch members 62 and 58 (see FIG. 14). This breaks the connection between the hub and the drive shaft. When this happens hub 24 is free to rotate, but the rest of the parts in the reel remain stationary. Consequently if the fishing line 133 is cast when the clutch members are separated, only the hub spins. This is what is called free spool casting.

As seen in FIG. 13, one end of a coil spring 134 is secured to the cam bar 64. The other end of this coil spring bears against the inner surface of cover 38. With this arrangement, when arm 124 of the actuating lever 118 moves out of engagement with the cam surface 132 on cam bar 64, the spring 134 bearing against cam bar 64 causes tines 129 and 131 to force the clutch member 62 back into clutching engagement with clutch member 58.

A coil spring 136 (seen in FIG. 6) is connected at one end to pin member 138 and at the other end to ear member 126 on lever 118. This biases the actuating lever 118 so arm 124 tends to move out of engagement with cam surface 132. However, for free spool casting, arm 124 must remain in engagement with cam surface 132 to keep the clutch members 58 and 62 separated. This requires a pawl mechanism.

The pawl mechanism includes a finger 140 which is perpendicular to and extends from the end of arm 124 (see FIGS. 6 and 10). A latch mechanism, which in this particular embodiment consists of members 142 and 144 is pivotally mounted on pin 146. Member 142 has a cam edge 148 and a locking recess 150.

As seen by a comparison between FIGS. 6 and 10, when the push member 116 bears against ear member 126, the actuating lever 118 is forced to pivot so finger 140 bears against cam edge 148. This pivots the latch mechanism until at the limit of rotation of the actuating lever 118, finger 140 enters recess 150. This recess is shaped so the restoring force exerted by coil spring 136 on actuating lever 118 causes finger 140 to exert a force on the latch mechanism which is radial to pivot 146. Consequently there is no rotative force exerted on the latch mechanism by the spring biased actuating lever 118, and the finger 140 is held in the recess 150. This keeps arms 124 in engagement with the cam surface 132 which in turn keeps the clutch members 58 and 62 separated.

Figure 7:
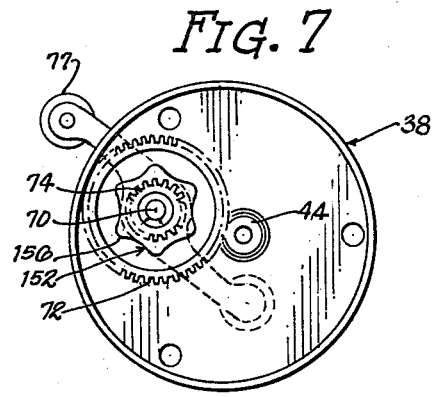
FIG. 7 is an inside view of the cover removed from the side of the fishing reel in FIG. 6 and showing an attached part.

A release mechanism is necessary to reconnect the hub with the drive mechanism, and it is desirable for this release mechanism to be connected to the reel handle 77 so that rotation of the handle automatically and promptly actuates the release mechanism. In this embodiment, the release mechanism is provided by forming a six lobe cam member 152 integral with drive shaft 70 and gears 72 and 74 (see FIGS. 7 and 10). A release trigger 154 in the form of a pin is formed on the end of latch member 144 and is in the path of the lobes 156 on cam member 152 (see FIG. 10). From this it is apparent that when the handle 77 is rotated causing the drive shaft 70 to rotate, one of the lobes 156 will be forced against the release trigger or pin 154 causing the latch mechanism to pivot until finger 140 moves out of recess 150.

When this happens, spring 136 forces actuating lever 118 to pivot so arm 124 moves out of engagement with cam surface 132. Then coil spring 134 causes tines 129 and 131 on cam bar 64 to force clutch members 62 and 58 back into clutching engagement with each other. After this, further rotation of the handle 77 causes the hub to rotate.

As seen in FIG. 6, a restoring coil spring 158 is secured at one end to a pin 159 on the surface of end plate 14 and at the other end to ear 160 on the latch member 142. With this arrangement, when the latch mechanism is pivoted by the engagement of a lobe 156 with release trigger 154, the restoring spring 158 returns the latch mechanism to its initial position where the release trigger 154 is held out of the path of the lobes on cam member 152.

The latch mechanism is made in two parts, in this particular embodiment, to permit a slight relative rotative movement between members 142 and 144. The reason is that when finger 140 moves into engagement with cam edge 148 to pivot the latch mechanism, a cam lobe 156 could be so positioned that it obstructs the pivoting movement of the latch mechanism enough so that finger 140 can't enter recess 150. To prevent this from happening, the latch mechanism is made in two relatively movable parts so that if a lobe 156 is in an obstructing position member 142 can still pivot, regardless of member 144, so that finger 140 can center recess 156 and lock the arm 124 in the position shown in FIG. 10.

In summary to this point, when lever arm 90 is pivoted from the position shown in FIGS. 1 and 6 to the position shown in FIGS. 5 and 12, the closed loop 106 also rotates with sleeve shaft 84, as shown in FIG. 5. At the same time the engagement of push arm 116 with ear member 126 pivots actuating lever 118 causing the clutch members 58 and 62 to separate for free spool casting (see FIGS. 6, 10 and 14). The latch mechanism locks the actuating lever in position to maintain the separation of the clutch members and the lever arm 90 in the erect cast position shown in FIG. 12.

When handle 77 is thereafter rotated, the engagement between one of the lobes 156 with release trigger 154 (see FIG. 10), forces the latching mechanism to pivot and to release arm 124 so it moves out of engagement with cam surface 132. When this happens the clutch members re-engage each other due to the biasing effort of spring 134. After this, further rotation of handle 77 causes the hub 24 to rotate, and it is noted that this occurs before one-sixth revolution of the handle and before one revolution of the hub. In addition, the return of actuating lever 118 from the cast position shown in FIG. 10 to the reel-in position shown in FIG. 6 simultaneously forces ear member 126 against push arm 116 to automatically return lever arm 90 from the erect position shown in FIG. 12 to its rest position in the slot 41, as shown in FIG. 1. When this happens, the closed loop automatically rotates back to the reel-in position so that the level wind is also operative before the handle makes one-sixth of a revolution. This prevents the fishing line from being wound unevenly.

When the lever arm 90 is in the position shown in FIGS. 1, 2 and 4, the closed loop or line guide 106 is in a reel-in position which is at a small angle generally parallel to the surface of the hub. When the lever arm 90 is pivoted to the position shown in FIGS. 5 and 12, the closed loop 106 is carried to an erect or cast position at a substantial angle to the surface of the hub. At the same time, this movement disconnects the hub from the drive mechanism, as explained above.

Figure 11:
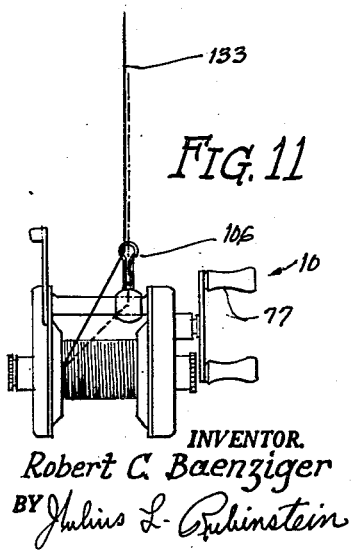
FIG. 11 is a plan view showing the level wind mechanism in a cast position and compares the angular relationship between the level wind and the fishing line when the level wind is in the cast position and when it is in the reel-in position.

The importance of this movement of the closed loop or line guide 106 can be seen in FIG. 11. There the solid line indicates the fishing line 133 passing through the line guide or closed loop when the line guide or closed loop is in the erect or cast position. The dotted line indicates the path the fishing line would follow if the line guide or closed loop were not mounted for this pivotal movement. It is apparent that when the fishing line comes off the end of the hub, the angle it makes in moving through closed loop 106 is more obtuse when the closed loop is in an erect cast position than it is when the closed loop is in the reel-in position. Consequently the drag caused by the force of engagement between the fishing line and the sides of the closed loop is substantially less when the closed loop or line guide is in the cast position than it is when the closed loop is in the reel-in position. In addition, since pivoting the line guide or closed loop to a cast position automatically disconnects the hub from the rest of the drive mechanism, the drag on the fishing line is not affected by wear, corrosion or dirt in the drive mechanism during casting. Consequently the cast will be smooth and accurate.

The use of a closed loop as a line guide has a further advantage in that it retains the fishing line thereon at all times. This means that the fishing line does not have to be manually reinserted in the level wind after a cast before the line can be reeled in. This avoids a delay in reeling in the fishing line which could be important if a fish should bite at the bait the instant the bait hits the water.

When the hub of a fishing reel is disconnected from the drive mechanism for free spool rotation during casting, drag on the hub due to friction in the bearings will be rather small.

Consequently there will be a tendency for the fishing line to slow up at a faster rate than the hub slows up when the fishing line is cast. If this happens, the hub may overrun the fishing line and interfere with the length and accuracy of the cast. To avoid this, it would be desirable for the hub to decrease its speed at the same rate the fishing line slows down during a cast. This requires the hub of the fishing reel to have a drag which is dependent on hub speed and which decreases as the hub speed decreases. To do this a centrifugal drag 162 has been provided (see FIG. 8).

Since the rate at which the fishing line slows down depends on the weight of the bait and the fishing line, it is desirable for the centrifugal drag 162 to be adjustable. In the embodiment shown in FIGS. 8 and 14, the adjustable centrifugal drag 162 includes an abutment plate 164 (see FIG. 15). This abutment plate includes a flat base portion 166 with angularly spaced circular peripheral portions 168. Generally cylindrical surfaces 170 are connected with and are transverse to each circular peripheral portion 168. Each of these cylindrical surfaces includes a blocking abutment 172, and as seen in FIG. 15, the abutments are disposed on diametrically opposite portions of the abutment plate 164 and are separated from each other by spaces 173. The abutment plate is provided with a centrally disposed opening 174 through which an end of tubular support shaft 26 extends (see FIG. 14).

This particular centrifugal drag further includes a pair of identical lineally elongated support plates 176 and 178. As seen in FIG. 16, each support plate is bifurcated at each end to define lineally spaced slots which serve as guideways 180. In addition, each support plate is provided with a centrally disposed opening 182 through which the end of tubular shaft 26 extends (as shown in FIG. 14).

Drag members 184 are provided. These drag members are generally cylindrical in shape with a reduced central portion which receives the edges of tines 181 of the support plates (see FIGS. 14 and 16). In this manner the drag members are free to slide in the slots or guideways 180.

A cylindrical tubular race 188 is provided. In this particular embodiment it is formed from hard rubber and is secured in opening 22 by any conventional means. It is to be understood, however, that under some circumstances the race could be formed integrally with the end plate 16. A combined spacer and bearing member 190 is provided (see FIG. 15). This member is provided with an opening 192 through which the end of shaft 26 extends. As seen in FIG. 14, the member 190 is positioned intermediate abutment plate 164 and support plates 176 and 178, and these support plates are designed to pivot on the bearing portion 192 of spacer member 190 (see FIG. 14). A nut 194 is screwed on the threaded end 56 of tubular shaft 26. This nut holds the side member 30, the abutment plate 164, and the support plates 176 and 178 in assembled relation (as shown in FIG. 14). With this arrangement, both the abutment plate 164 and the support plates 176 rotate with the hub 24. In addition, the support plates can be pivoted with respect to the abutment plate 164 and with respect to each other.

The ends of the guideways 180 terminate near the race 188 so that when the hub spins the rollers tend to move along the radial guideways into a rolling engagement with the race 188 due to centrifugal force. As seen in FIG. 8, it is possible to rotate or pivot the support plates so abutments 172 face the slots 180 and prevent the drag rollers 184 from moving into engagement with race 188. As shown in FIG. 8, the guideways or slots 180 in support plate 178 face abutments 172. Consequently the rollers 184 thereon can't move into dragging engagement with race 188. On the other hand the support plate 176 is positioned so the slots or guideways 180 face openings 173 so that the drag rollers 184 thereon are free to move into dragging engagement with the race 188.

With the above described arrangement of parts, it is evident that this embodiment of the centrifugal drag can have at least three different drag adjustments. For maximum centrifugal drag the support plates 176 and 178 are rotated so their guideways 180 face openings 173 so that all four drag rollers 184 are free to move into rolling dragging engagement with the race 188. For intermediate drag, one of the support plates is rotated so the abutments 172 are in its slots or guideways 180 and the drag rollers thereon are thereby prevented from moving into engagement with race 188. For minimum drag, both support plates are rotated so all the slots 180 face abutments 172 so that none of the drag rollers thereon can engage race 188. It is also clear that still another drag adjustment could be provided if the drag rollers on one support member had a different size and weight from those on the other support member. In addition, it is also apparent that the abutment plate 164 could be modified to provide additional abutments and additional support plates and drag rollers could be added to provide a more graduated drag adjustment.

Figure 9:
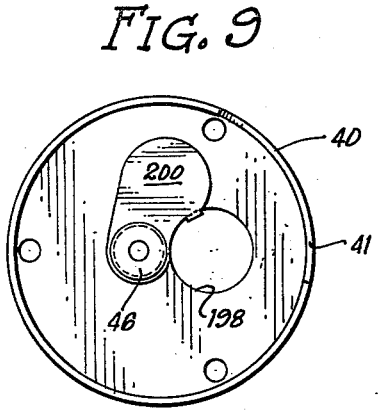
FIG. 9 is an inside view of the cover removed from the side of the fishing reel in FIG. 8.

In order to conveniently rotate support plates 176 and 178, they are each provided with generally perpendicular fingers 196, as shown. In addition, the cover plate 40 of the fishing reel is provided with an opening 198 (see FIGS. 3 and 9). When the hub 24 of the fishing reel is rotated, the ends of fingers 196 will become visible and accessible through opening 198 so that the support plates can be pivoted as desired by inserting a convenient tool, such as a pencil or stick, in opening 198 and pressing it against the fingers 196. In addition, a closure member or shutter 200 is pivotally mounted on bearing 46 (see FIG. 14). This shutter is designed to be moved into position to close off opening 198 and thereby prevent the entrance of dirt or moisture inside the reel when adjustments of the centrifugal drag are not desired.

A further modification of the adjustable centrifugal drag is shown in FIG. 17. In this embodiment, a single support plate 202 is provided. Support plate 202 is secured to the end of hub 24 by any suitable means, and in the embodiment shown in circular and coaxial with shaft 26. In addition, it is provided with four radial guideways or slots 204 disposed at 90° angles. Drag members 206 which may be in the form of drag rollers like members 184 are slidably mounted in the radial slots by any suitable means. In addition, abutment bars 208 and 209 with diametrically opposite and generally perpendicular abutments 210 are mounted on a shaft 26. These bars are designed to be pivotally mounted with respect to support plate 202 and with respect to each other by means of the integral generally perpendicular fingers 212. It is apparent that by suitably rotating these bars, selected pairs of abutments 210 can move over guideways 204 in the path of the drag members 206. This would prevent the drag members from moving into dragging engagement with race 188. In this manner the centrifugal drag shown in FIG. 17 can be adjusted exactly as described in the modification shown in FIGS. 3 and 8. It is also understood that the centrifugal governor could be modified to use different kinds of drag members which slide on other differently shaped guideways.

The invention may be embodied in other forms without departing from the spirit or essential characteristics thereof as set forth in the claims, and the present embodiment is therefore to be considered as illustrative and not restrictive and it is intended to include all changes which come within the scope and range of the claims.

I claim:

1. A fishing reel of the class described comprising in combination a support, a hub rotatably mounted on said support, a drive mechanism, a level wind mounted on said support, said level wind including a line guide for oscillatory movement, and means releasably connecting said drive mechanism and said level wind with said hub so that operation of said drive mechanism causes said hub to rotate and said line guide to oscillate, said line guide comprising a closed loop for retaining the fishing line during a cast but permitting the line to pass freely therethrough, manually operatable means on the support and connected to said closed loop for selectively moving said closed loop between a reel-in position at a small angle to the adjacent surface of the hub and a cast position at a substantial angle to the adjacent surface of the hub, said closed loop shaped so when in a cast position any engagement between the fishing line and the closed loop during a cast will be insufficient to introduce appreciable drag on the line, and means for breaking the connection between the hub and said drive mechanism and level wind so that all the parts except the rotating hub are stationary when the fishing line is cast.

2. A fishing reel of the class described comprising in combination a support, a hub rotatably mounted on said support, a drive mechanism, a level wind mounted on said support, said level wind including a line guide for oscillatory movement along a path, means releasably connecting said drive mechanism and said level wind with said hub so that operation of said drive mechanism causes said hub to rotate and said line guide to oscillate on said path, said line guide comprising a closed loop, said closed loop adjustably mounted on said support and movable between a reel-in position generally parallel to the adjacent surface of the hub and a cast position at a substantial angle to the adjacent surface of the hub, and actuating means simultaneously breaking the connection between the hub and said drive mechanism and level wind when moving said closed loop to the cast position so that all parts except the rotating hub are stationary when the fishing line is cast, so that the fishing line is retained in the stationary line guide, and so any engagement of the fishing line with the sides of the closed loop will be insufficient to appreciably increase the drag on the line.

3. The fishing reel described in claim 2 including reconnecting means responsive to manual actuation of said drive mechanism for simultaneously reconnecting the drive mechanism with the hub and the level wind and moving said line guide from a cast position to a reel-in position after the fishing line has been cast.

4. A fishing reel of the class described comprising in combination a support, a hub rotatably mounted on said support, a first shaft rotatably mounted on said support and positioned parallel to the rotational axis of said hub, a drive mechanism mounted on said support, means connecting said drive mechanism with said first shaft and said sub so that operation of said drive mechanism causes said hub and said first shaft to rotate, said first shaft having reverse threads thereon, a second shaft concentric with said first shaft and rotatably mounted on said support, said second shaft having an elongated slot therein, a line guide mounted on said second shaft and rotatable therewith, said line guide having a portion extending through said elongated slot into engagement with said reverse threads on said first shaft whereby rotation of said first shaft causes said line guide to oscillate back and forth on the surface of said second shaft, rotating means for rotating said second shaft and carrying said line guide from a reel-in position generally parallel to the adjacent surface of the hub to a cast position at a substantial angle to the adjacent surface of the hub, and actuating means movable with said second shaft for movement into engagement with a part of said drive mechanism for breaking the connection between said hub and said drive mechanism when said second shaft is rotated enough to move the line guide from a reel-in position to a cast position, said line guide comprising a closed loop shaped so when the fishing line is cast the line is retained in the closed loop and shaped so fishing line can pass freely therethrough whereby any engagement between the fishing line and the line guide during its cast will be insufficient to appreciably increase the drag on the line.

5. A fishing reel of the class described comprising in combination a support, a hub rotatably mounted on said support, a first shaft rotatably mounted on said support and positioned parallel to the rotational axis of said hub, a drive mechanism mounted on said support, means connecting said drive mechanism with said first shaft and said hub so that operation of said drive mechanism causes said hub and said first shaft to rotate, said first shaft having reverse threads thereon, a second shaft concentric with said first shaft and rotatably mounted on said support, said second shaft having an elongated slot therein, a line guide mounted on said second shaft and rotatable therewith, said line guide having a portion extending through said elongated slot into engagement with said reverse threads on said first shaft whereby rotation of said first shaft causes said line guide to oscillate back and forth on the surface of said second shaft, rotating means for rotating said second shaft and carrying said line guide from a reel-in position generally parallel to the adjacent surface of the hub to a cast position at a substantial angle to the adjacent surface of the hub, said line guide shaped so when the fishing line is cast the fishing line is retained in the line guide and shaped so any engagement between the fishing line and the line guide during the cast will be insufficient to appreciably increase the drag on the line, and actuating means movable with said second shaft for movement into engagement with a part of said drive mechanism for breaking connection between said hub and drive mechanism when said second shaft is rotated enough to move the line guide from a reel-in position to a cast position, and including means associated with said drive mechanism for automatically reconnecting said hub to said drive mechanism and returning said line guide from said cast position to said reel-in position when said drive mechanism is operated.

6. A fishing reel of the class described comprising in combination a support, a hub rotatably mounted on said support, a first shaft rotatably mounted on said support and positioned parallel to the rotational axis of said hub, a drive mechanism mounted on said support, means connecting said drive mechanism with said first shaft and said hub so that operation of said drive mechanism causes said hub and said first shaft to rotate, said first shaft having reverse threads thereon, a second shaft concentric with said first shaft and rotatably mounted on said support, said second shaft having an elongated slot therein, a line guide mounted on said second shaft and rotatable therewith, said line guide having a portion extending through said elongated slot into engagement with said reverse threads on the first shaft whereby rotation of the first shaft causes said line guide to oscillate back and forth on the surface of said second shaft, rotating means for rotating said second shaft and carrying said line guide from a reel-in position generally parallel to the adjacent surface of the hub to a cast position at a substantial angle to the adjacent surface of the hub, said line guide shaped so when the fishing line is cast the fishing line is retained in the line guide and so any engagement between the fishing line and the line guide during the cast will be insufficient to appreciably increase the drag on the fishing line, and actuating the means movable with said second shaft for movement into engagement with a part of said drive mechanism for breaking the connection between said hub and said drive mechanism when said second shaft is rotated enough to move the line guide from a reel-in position to a cast position, said actuating means comprising a first gear secured to said second shaft and rotatable therewith, a third shaft rotatably mounted on said support in spaced parallel relation to said second shaft, a second gear secured to said third shaft and meshing with said first gear whereby rotation of said second shaft causes said third shaft to rotate, and a push member rigidly secured to said third shaft, a clutch between said drive mechanism and said hub, linkage connected between said push member and said clutch whereby rotation of said third shaft causes said push member to move said linkage and thereby disengage said clutch, whereby the hub is disengaged from said drive mechanism for free spool casting.

7. A fishing reel of the class described comprising in combination a support, a hub rotatably mounted on said support, a first shaft rotatably mounted on said support and positioned parallel to the rotational axis of said hub, a drive mechanism mounted on said support, means connecting said drive mechanism with said first shaft and said hub so that operation of said drive mechanism causes said hub and said first shaft to rotate, said first shaft having reverse threads thereon, a second shaft concentric with the first shaft and rotatably mounted on said support, said second shaft having an elongated slot therein, a line guide mounted on said second shaft and rotatable therewith, said line guide having a portion extending through said elongated slot into engagement with said reverse threads on the first shaft whereby rotation of the first shaft causes said line guide to oscillate back and forth on the surface of second shaft, rotating means for rotating said second shaft and carrying said line guide from a reel-in position generally parallel to the adjacent surface of the hub to a cast position at a substantial angle to the adjacent surface of the hub, said line guide shaped so when the fishing line is cast the fishing line is retained in the line guide and so any engagement between the fishing line and the line guide during the cast will be insufficient to appreciably increase the drag on the fishing line, and actuating means movable with said second shaft for movement into engagement with a part of said drive mechanism for breaking the connection with said hub and said drive mechanism when said second shaft is rotated enough to move the line guide from a reel-in position to a cast position, said actuating means including a first gear secured to said second shaft and rotatable therewith, a third shaft rotatably mounted on said support in spaced parallel relation to said second shaft, a second gear secured to said third shaft and meshing with said first gear whereby rotation of said second shaft causes said third shaft to rotate, and a push member rigidly secured to said third shaft, a clutch engaging the hub for connecting the hub with the drive mechanism, a first cam member in engagement with said clutch, an actuating member associated with and driven by said push member and movable into engagement with said first cam member whereby said clutch is moved out of engagement with said hub, biasing means connected to said actuating member for urging it out of engagement with said first cam member, holding means for holding said actuating member in engagement with said first cam member for free spool casting, and release means, said release means including a release trigger and a second cam member movable with said drive mechanism for engagement with said release trigger whereby said actuating member is released so it can move out of engagement with said first cam member so that the clutch is reconnected to the hub and the line guide is returned to a reel-in position when said drive mechanism is operated.

8. A fishing reel of the class described comprising in combination a support, a hub rotatably mounted on said support, a first shaft rotatably mounted on said support and positioned parallel to the rotational axis of said hub, a drive mechanism mounted on said support, means connecting said drive mechanism with said first shaft and said hub so that operation of the drive mechanism causes said hub and said first shaft to rotate, said first shaft having reverse threads thereon, a second shaft concentric with said first shaft and rotatably mounted on said support, said second shaft having an elongated slot therein, a line guide mounted on said second shaft and rotable therewith, said line guide having a portion extending through the elongated slot into engagement with said reverse threads of the first shaft whereby rotation of said first shaft causes the line guide to oscillate back and forth on the surface of said second shaft, rotating means for rotating said second shaft and carrying said line guide from a reel-in position generally parallel to the adjacent surface of the hub to a cast position at a substantial angle to the adjacent surface of the hub, said line guide shaped when the fishing line is cast the fishing line is retained in the line guide and so any engagement between the fishing line and the line guide during the cast will be insufficient to appreciably increase the drag on the fishing line, and actuating means movable with second shaft for movement into engagement with a part of said drive mechanism for breaking the connection with said hub and said drive mechanism when said second shaft is rotated enough to move the line guide from a reel-in position into a cast position, said actuating means including a third shaft rotatably mounted on said support in spaced parallel relation to said second shaft, means connecting said second and third shafts together so that when said second shaft is rotated said third shaft rotates, a push member secured to an end of said third shaft and clutch means actuated by said push member for breaking the connection between said hub and said drive mechanism for free spool casting.

9. The fishing reel described in claim 6 including means for automatically reconnecting said hub to said drive mechanism and returning said line guide from said cast position to said reel-in position when said drive mechanism is actuated.

References Cited in the file of this patent
UNITED STATES PATENTS

| | | |
|---|---|---|
| 1,345,072 | Case | June 29, 1920 |
| 1,939,148 | Spenny | Dec. 12, 1933 |
| 1,971,470 | Watson | Aug. 28, 1934 |
| 2,317,835 | Watson | Apr. 27, 1943 |
| 2,380,670 | Nelson | July 31, 1945 |
| 2,613,044 | Zetts | Oct. 7, 1952 |
| 2,639,870 | Graham | May 26, 1953 |
| 2,652,991 | Murvall | Sept. 22, 1953 |
| 2,673,043 | Verbeke | Mar. 23, 1954 |
| 2,686,016 | Kilian | Aug. 10, 1954 |
| 2,933,264 | Bullen | Apr. 19, 1960 |
| 2,953,314 | Voll | Sept. 20, 1960 |